J. MUTH.
HEN'S NEST.
APPLICATION FILED MAY 18, 1911.
1,017,790.
Patented Feb. 20, 1912.
2 SHEETS—SHEET 1.
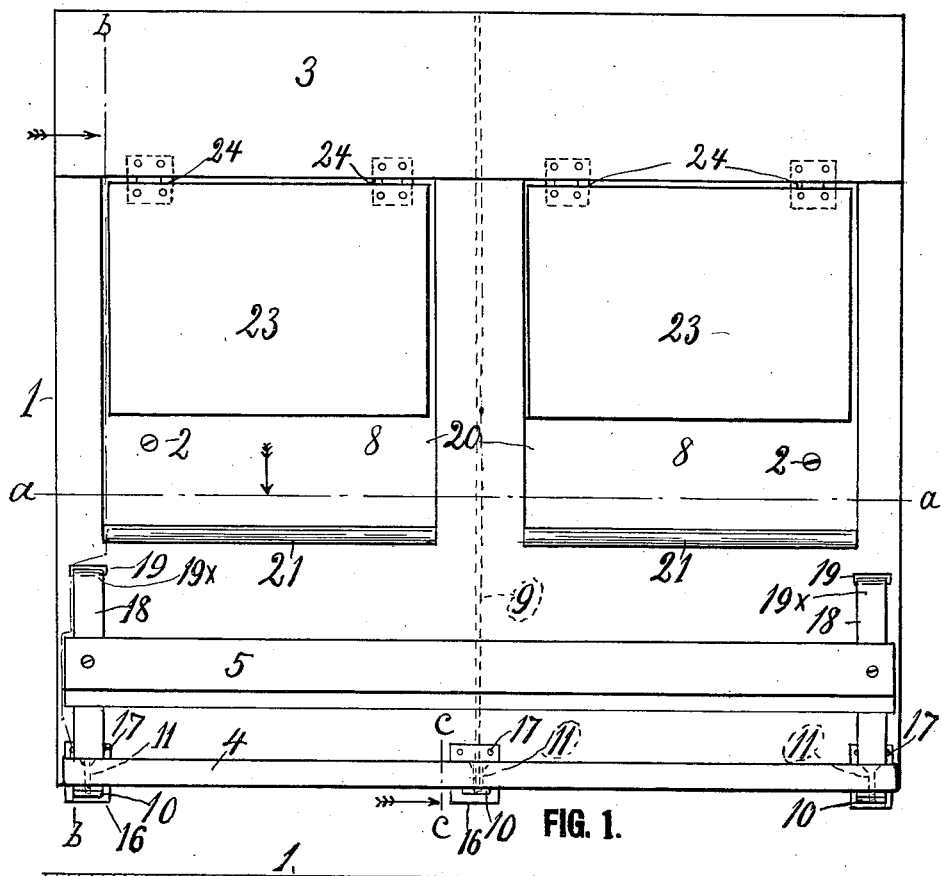
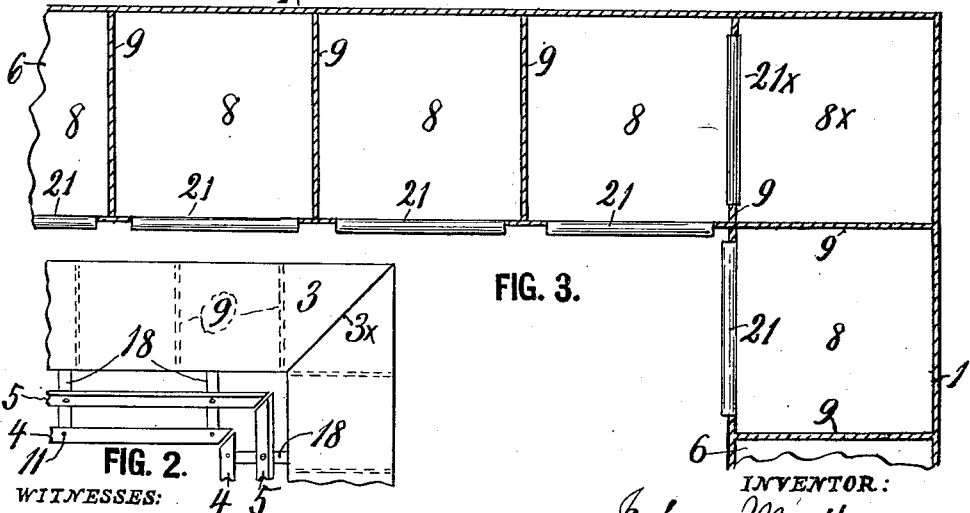
WITNESSES:
E. C. Carlsen.
Mabel Carlsen.
INVENTOR:
John Muth.
BY his ATTORNEY:
A. M. Carlsen.

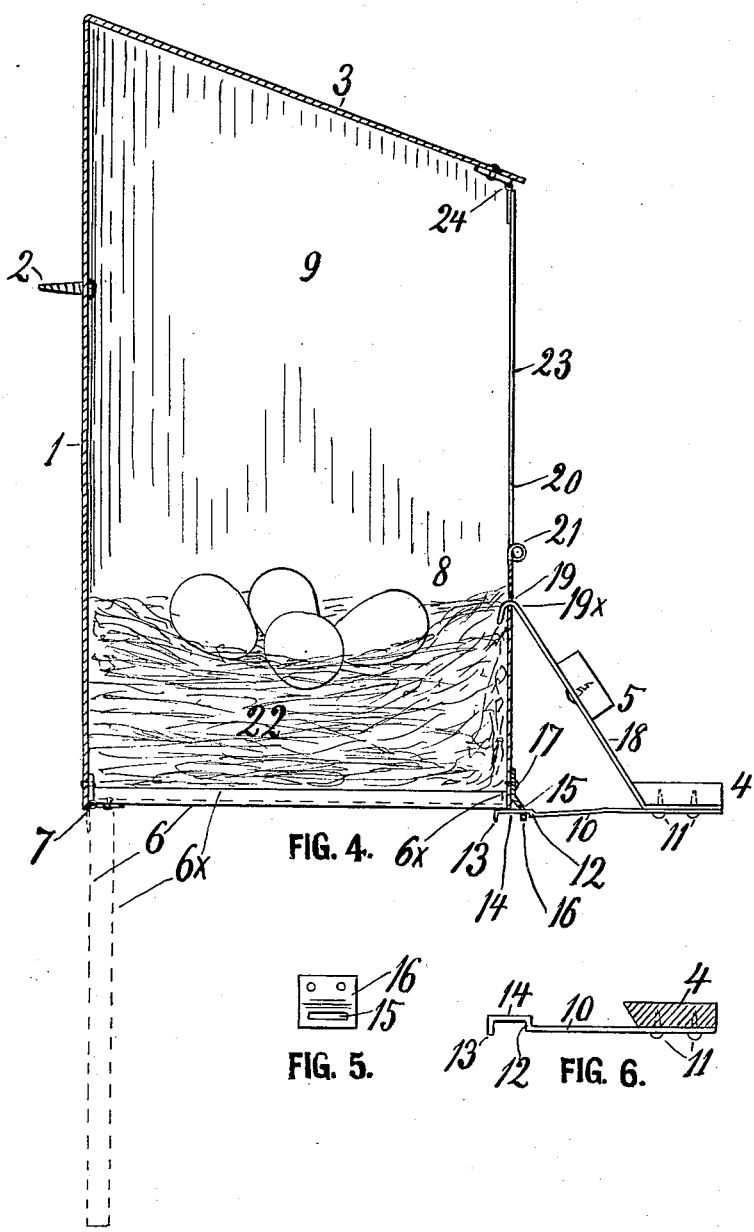

UNITED STATES PATENT OFFICE.

JOHN MUTH, OF BRITTON, SOUTH DAKOTA.

HEN'S NEST.

1,017,790.  Specification of Letters Patent.  Patented Feb. 20, 1912.

Application filed May 18, 1911. Serial No. 628,085.

*To all whom it may concern:*

Be it known that I, JOHN MUTH, a citizen of the United States, residing at Britton, in the county of Marshall and State of South Dakota, have invented a new and useful Hen's Nest, of which the following is a specification.

My invention relates to hen's nests; and the object is to provide a durable and sanitary nesting box of such construction that the hens can not roost on any of its parts.

In the accompanying drawings,—Figure 1 is a front elevation of a box or housing containing two nests and steps embodying the main features of my invention. Fig. 2 is a top view on a reduced scale of a series of nests arranged in angularly joined rows, so as to fit two adjacent walls and one corner in a chicken house. Fig. 3 is a horizontal sectional view of the box work in Fig. 2, enlarged and taken as high up as on the line $a$—$a$ in Fig. 1. Fig. 4 is a sectional end elevation on the line $b$—$b$ in Fig. 1. Fig. 5 is a detail view of one of the keepers 16 in Figs. 1 and 4. Fig. 6 is a section on the line $c$—$c$ in Fig. 1.

Referring to the drawings by reference numerals, 1 designates the nesting box, which is preferably made of galvanized iron and may be secured upon the wall of the chicken house by screws arranged as indicated at 2 in Figs. 1 and 4, or by other suitable means.

The roof 3 of the box is a single sheet or piece and slants forwardly so as to prevent chickens from roosting on it. When the box is built angular, as in Figs. 2 and 3 indicated, the roof is mitered as at $3^\times$ in Fig. 2 and the stepping bars 4 and 5 in front of the box are similarly arranged.

The bottom 6 of the box is hinged at 7 to the lower edge of the rear wall of the box, and may extend integrally along to form the bottoms of several of the nesting compartments 8, 8, $8^\times$, which are separated by fixed partitions 9. The front edge of the bottom 6 is supported on the inner ends of several bars 10, each of which is secured at 11 to the underside of the wooden stepping bar 4, and has its inner end provided with a shoulder 12 and a hook 13, which limit the sliding movement of the intermediate portion 14 of the bar, said portion being guided in the aperture 15 of a keeper 16, which is secured at 17 to the front wall of the box. From each bar 4 extends upwardly two or more slanting hanger bars 18, whose upper ends are hook-shaped at $19^\times$ and hingedly engaged in apertures 19 in the front wall. The slanting stepping bar 5 is secured to said hangers, and together therewith and with the bar 4 may be termed a stepping frame.

A suitable distance above the bar 5 each nesting compartment is provided with a forward opening 20 for the passage of the bird to and from the nest. The lower terminal of each opening is provided with a stepping bar 21 to facilitate the passing of the bird from and to the nest, which nest is arranged in each compartment about as indicated at 22 in Fig. 4.

In Fig. 3 is shown how the nest compartment $8^\times$ has an opening at $21^\times$ for the bird to enter after passing through one of the adjacent compartments 8. In this way the corner compartment $8^\times$ is utilized, so no space in the box need be idle.

The upper about two-thirds of each door opening is normally closed by a door 23, swinging freely out and in on hinges 24 at its upper edge.

In Fig. 4 the bottom 6 is shown to have its front and end edges $6^\times$ turned upward at right angles to the bottom, so as to stiffen it. In said view the step 21 is shown as formed by curving a portion of the sheet-metallic front wall of the box into a substantially cylindrical form.

In the use or operation of the device, no chicken can roost on the step 4, because the step 5 is so near by that the chicken can not take a roosting position; likewise the front wall prevents a roosting position on the step 5, and the door 23 prevents roosting position on the step 21, and the slanting roof prevents roosting on the top of the box. The hens are thus prevented from dirtying the eggs and the nests by unnecessary occupation of any part of the device. In passing to and from the nest the bird opens the door by pushing against it.

When the nests are to be cleaned, the stepping frame 4—5—10—18 is swung forward on the hinge-hooks $19^\times$ until the hooks 13 stop against the keepers 16, and thus leave the bottom 6 free to be dropped to the position shown in dotted line in Fig. 4. After the nests are cleaned, the bottom is restored to its normal position and locked by the inner ends of the bars 10, which are pushed inward under the bottom by the weight of the stepping frame, the shoulders 12 limiting said inward sliding movement of the bars 10.

Having thus described the invention, what I claim is:

1. A nesting box having a door opening and a door hingedly suspended from the upper end of the opening and extending partly down into the opening, with freedom to swing in and out therethrough.

2. A nesting box having a door opening and a door hinged from the upper end of the opening and partly filling the same, with freedom to swing in and out in the opening; stepping strips arranged below the door opening at the outer side of the box; said strips being arranged in such proximity to each other and to the box that chickens or similar birds can not roost on them.

3. A nesting box having its bottom hinged at the rear edge to the box, and catches supporting its front edge when the bottom is in a level position; a stepping frame hingedly mounted at the front side of the box and diverging therefrom with its lower portion, and operative connections between said lower portion and the catches supporting the bottom, whereby the weight of the stepping frame holds the catches engaged; said front wall having openings for the birds to pass through.

4. In a device of the kind described, an elongated box divided by vertical partitions into a plurality of nesting compartments, an inclined roof covering the box, a bottom hinged to the box and extending underneath several of the compartments, to form the bottoms thereof, a swinging stepping frame hinged to the front of the box, to swing with its lower portion to and from the same; keepers on the box, bars extending from lower portion of the frame and guided in said keepers, the inner ends of said bars forming supports for the front edge of the bottom opposite from the edge having no hinges; said front wall having openings, and doors hinged in the upper ends of the openings, so as to be pushed open in either direction by a passing bird.

5. A nesting box forming an angular row of nesting compartments, each compartment having a door directly through the front wall of the box, excepting the compartment at the angle of the row, which opens into one of the adjacent compartments.

In testimony whereof I affix my signature, in presence of two witnesses.

JOHN MUTH.

Witnesses:
A. M. CARLSEN,
THEODORE SANDERS.

---

Copies of this patent may be obtained for five cents each, by addressing the "Commissioner of Patents, Washington, D. C."